United States Patent
Mahapatra et al.

(10) Patent No.: US 6,301,399 B1
(45) Date of Patent: Oct. 9, 2001

(54) INTEGRATED OPTIC MODULATORS WITH HIGH GAIN BANDWIDTH PRODUCT

(75) Inventors: Amaresh Mahapatra, Acton, MA (US); Peter F. Hallemeier, Meriden, CT (US); Hai Qing Li, Worcester, MA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/248,609

(22) Filed: Feb. 11, 1999

Related U.S. Application Data
(60) Provisional application No. 60/075,056, filed on Feb. 18, 1998.

(51) Int. Cl.⁷ .................................................. G02B 6/12
(52) U.S. Cl. ...................... 385/2; 385/1; 385/3; 385/14; 385/40
(58) Field of Search .................... 385/1–4, 8, 9, 385/14, 15, 16, 24, 27, 31, 39, 40, 41, 130, 131, 132; 333/33, 26, 206, 243, 244, 245, 219

(56) References Cited

U.S. PATENT DOCUMENTS

| | | |
|---|---|---|
| 4,023,887 | 5/1977 | Speers . |
| 4,791,388 | 12/1988 | Sanford et al. . |
| 5,302,237 | 4/1994 | Larson et al. . |
| 5,324,553 | 6/1994 | Ovshinsky et al. . |
| 5,339,369 | 8/1994 | Hopfer et al. . |
| 5,455,876 * | 10/1995 | Hopfer et al. ............................ 385/2 |
| 5,503,901 | 4/1996 | Sakai et al. . |
| 5,563,965 * | 10/1996 | Madabhushi ............................ 385/2 |

OTHER PUBLICATIONS

Alferness, Rod C., Waveguide Electrooptic Modulators, IEEE Transactions on Microwave Theory and Techniuques, vol. MTT–30, No. 8, pp 1121–1137, Aug.1982.

Chung, Haeyang and Chang, William S. C., Modeling and Optimization of Traveling–Wave LiNbO3 Interferometric Modulators, IEEE Journal of Quantum Electronics, vol. 27, No. 3, Mar. 1991.

Kawano, Kenji, High–Speed Shielded Velocity–Matched Ti: LiNbO3 Optical Modulator, IEEE Journal of Quantum Electronics, vol. 29, No. 9, Sep. 1993.

Gopalakrishnam, Ganesh K., Burns, William K., McElhanon, Robert W., Bulmer, Catherine H. and Greenblatt, Arthur S., Performance and Modeling of Broadband LiNbO3 Traveling Wave Optical Intensity Modulators, Journal of Lightwave Technology, vol. 12, No. 10, Oct 1994.

* cited by examiner

Primary Examiner—Frank G. Font
Assistant Examiner—Michael P. Mooney
(74) Attorney, Agent, or Firm—Francis J. Caufield

(57) ABSTRACT

The present invention relates to integrated optic modulator devices and methods for their fabrication. Lithium niobate substrates have waveguides fabricated in them for propagating light energy, preferably in Mach Zhender architectures. The waveguides are bordered by adjacent electrode metallizations of low resistivity, such as copper and silver, to provide the devices with high gain bandwidth products to reduce the cost of drive electronics and simplify processing procedures. Gain bandwidth products exceed $4.5 \times 10^5$.

12 Claims, 9 Drawing Sheets

INTEGRATED OPTIC MODULATORS WITH HIGH GAIN BANDWIDTH PRODUCT

REFERENCE TO RELATED APPLICATION

This application claims priority from U.S. Provisional Application Serial No. 60/075,056 filed Feb. 18, 1998

BACKGROUND OF THE INVENTION

Broad-band and high speed guided wave lithium niobate modulators are important components for emerging wideband communication and signal processing systems. Various types of high speed modulator-switches have been reported as, for example in: (1) "Waveguide Electrooptic Modulators" IEEE Transactions on Microwave Theory and Techniques, Vol. MTT-30, No. 8, pp 1121–1137, Aug 1982; (2) "Performance and Modeling of Broadband $LiNbO_3$ Traveling Wave Optical Intensity Modulators", Journal of Lightwave Technology, Vol. 12. No 10, pp 1807, October 1994; (3). "High Speed Shielded Velocity-Matched Ti:LiNbO_3 Optical Modulator". IEEE Journal of Quantum Electronics. Vol. 29. No. 9, pp 2466, September 1993; and (4) "Modeling and Optimization of Traveling Wave $LiNbO_3$ Interferometric Modulators", IEEE Journal of Quantum Electronics, Vol. 27, No. 3, pp 608, March 1991. Among them, the interferometric type modulator using Y-branches is the most widely used structure for broadband modulation because of its simplicity. As desired modulation and switching speed increase, limitations in available drive power and power dissipation demand that these modulators operate at the highest electrical efficiency.

In the typical modulator design, the input optical waveguide is split via a first Y-junction into two collinear waveguides and RF electrodes are positioned parallel to these guides. As the optical wave propagates, the phase difference between the two waveguides is modulated by a traveling RF wave. When the two beams are combined via a second Y-junction, the output is either a maximum or a minimum, depending on whether the cumulative phase difference is an even or odd multiple of $\pi$ radians, respectively. This is the fundamental operating principle of the optical modulator.

Several years back, it was recognized that one of the fundamental problems with achieving high modulation bandwidth with lithium niobate modulators was the mismatch between the optical and RF propagation velocities. This mismatch arises because the optical refractive index of lithium niobate is about 2.2 while the RF refractive index is about 6.3. Thus, the RF power travels much slower than the optical power. Therefore, as the two forms of power propagate down the waveguide, the RF wavefront falls behind the optical wavefront. This results in reduced modulation efficiency at the higher frequencies, and the modulation bandwidth becomes frequency limited.

However, the velocity mismatch problem has been largely solved. It was recognized that, although the high RF dielectric constant of lithium niobate ($\cong 40$) results in the velocity mismatch problem, suitable design of the RF waveguide parameters, such as electrode width, gap and thickness, and suitable choice of buffer layer thickness (for example 1.2 $\mu m$ of $SiO_2$), cause more of the RF energy to travel in the region outside the lithium niobate so that the effective dielectric constant is reduced to 5. The RF refractive index now drops close to 2.2, and velocity mismatch is no longer the limiting factor in bandwidth of the modulator. This optimized design for a velocity matched modulator, since it relies on redistributing the RF power between the substrate and the surrounding region, depends only on the waveguide parameters and not on the properties of the specific metal used for the electrode.

As frequency increases, the cost of drive electronics increases significantly for any given drive voltage. Therefore, at the higher frequencies, above 10 GHz, one would like to design modulators with very long electrodes so that the RF power needed for modulation would be minimized. In theory, with the velocity mismatch problem solved, increasing the electrode length should have no adverse effect. In practice, this is not the case. A new limiting factor—conductor loss in the electrode—enters the picture.

As is well known, , the penetration of the RF field into a metal conductor decreases as frequency increases. The extent of penetration is conventionally characterized by the skin depth. Thus, the volume within the conductor in which the RF power travels decreases with increasing frequency. It can be shown that this results in an ohmic loss in the conductor, which increases as the square root of the frequency, linearly with electrode length, and limits the bandwidth of the modulator. Conventionally, velocity matched electrodes have been fabricated using electroplated gold electrodes.

It is the primary object of this invention to show that the gain bandwidth product of velocity matched modulators can be increased by as much as 40% by the use of low resistivity metals such as copper instead of gold and by 47% by the use of silver instead of gold. Thus, for example, the highest bandwidth of a known commercially available modulator today is 40 GHz. This can be increased to about 56 GHz by use of copper. Conversely, the drive voltage of a known commercial 10 GHz modulator, used in the OC192 communications architecture, can be reduced from 7 volts to 3.5 volts by using copper instead of gold, without sacrificing bandwidth. This will reduce the cost of the drive electronics significantly.

SUMMARY OF THE INVENTION

The present invention relates to integrated optic modulator devices. Lithium niobate substrates have waveguides fabricated in them for propagating light energy, preferably in Mach Zehnder architectures. The waveguides are bordered by adjacent electrode metallizations of low resistivity, such as copper and silver, to provide the devices with high gain bandwidth products to reduce the cost of drive electronics and simplify processing procedures.

BRIEF DESCRIPTION OF THE DRAWINGS

The structure, operation, and methodology of the invention, together with other objects and advantages thereof, may best be understood by reading the detailed description in connection with thy drawings in which unique reference numerals have been used throughout for each and wherein.

DETAILED DESCRIPTION OF THE INVENTION

The present invention relates to the use of high conductivity metals (low resistivity), such as copper and silver, for fabricating electrodes in velocity matched optical modulators. To achieve velocity match, the electrodes have to be several microns thick—from 10 to 100 microns. To achieve high voltage gain, the length of the electrodes typically is within the range between approximately 4 to 100 mm. The present invention incorporates lithographic developments and electroplating techniques to achieve structures with these dimensions for velocity matching along with the use of electrodes of high conductivity to achieve modulation devices with high gain bandwidth products.

Figure 1:
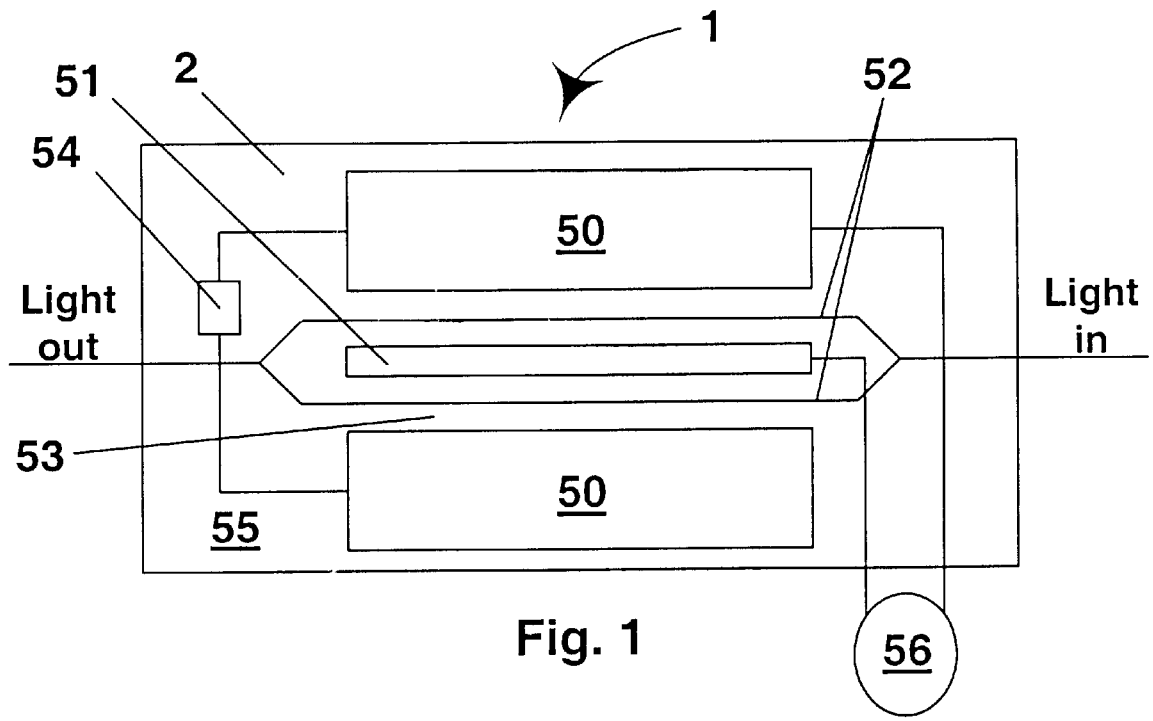
FIG. 1 is a diagrammatic plan view of an optical modulator with traveling wave electrode.

Referring now to FIG. 1, there is shown one embodiment of the present invention that has been fabricated and tested. This embodiment is in the form of a modulator designated generally at 1. Modulator 1 comprises waveguides that have been formed in a substrate 2, preferably of lithium niobate. The waveguides are marked 52. A buffer layer consisting of 1.2 micron thick silicon dioxide, 55, is deposited on the waveguide structure. The coplanar waveguide electrodes are formed on top of the buffer layer 55, and comprise a central electrode 51 and ground planes 50 on both sides thereof and a gap 53. The metallization for the electrode regions is preferably copper with a thickness of 25 microns or more for acceptable performance out to 10 GHz or greater. For performance less than 10 GHz, the metallization thickness may be reduced accordingly The width of the electrode 51, the gap 53, the thickness of the metal electrodes, the thickness of the buffer material, and the dielectric constant of the buffer material determine the characteristic impedance of the coplanar waveguide. The coplanar waveguide is terminated with in characteristic impedance 54 for best RF performance. Light is launched into the guides and extracted from the guides via optical fibers. An RF driver 56 is connected to the electrodes.

Figure 13:
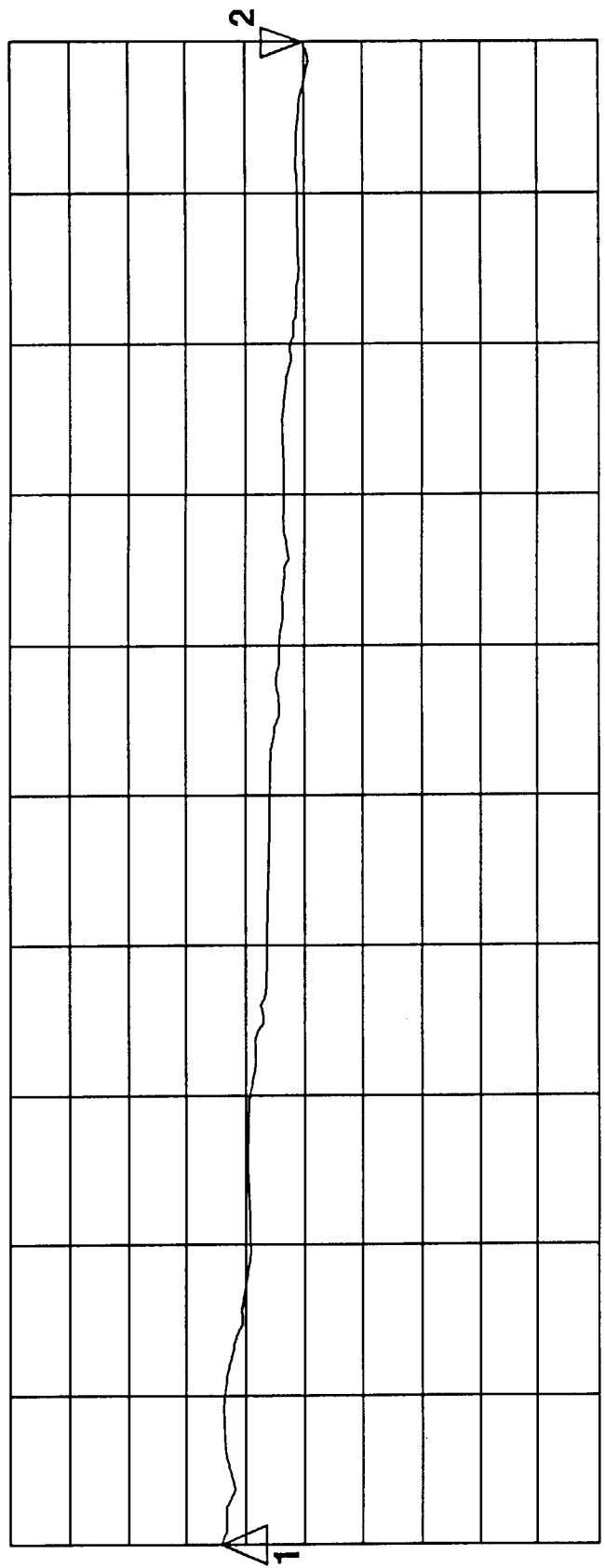
FIG. 13 is a graph of the optical modulation signal of an inventive modulator as a function of frequency over the frequency range from 0.13 to 10.0 GHz.

The optical modulation bandwidth is measured using an HP Lightwave Analyzer. This instrument has a swept frequency RF driver that is used to drive the modulator electrodes. The modulated optical signal is converted into the electrical domain through an optical receiver that is part of the Lightwave Analyzer. The Lightwave Analyzer sweeps the RF frequency and plots the magnitude of the modulation signal as a function of frequency. In FIG. 13, the horizontal axis is RF frequency from 0.13 GHz to 10.0 GHz, and the vertical axis is optical modulation signal measured in dBe, where 0.0 dBe is equal to 1.0 watt/Amp. Note that the scale of the vertical axis is 3 dBe/division. The bandwidth of a modulator is conventionally defined as the frequency over which the optical modulation drops by 3 dBe of its value at the lowest frequency. Therefore, as is clear, the bandwidth of the inventive modulator is about 10 GHz. Note that the Vpi (voltage needed to modulate the optical output from a maximum to minimum) for the inventive modulator is 3.0 volts at 1 KHz. The Vpi of the best commercial 10 GHz modulator known with gold electrodes is about 4.0 volts.

Figure 14:
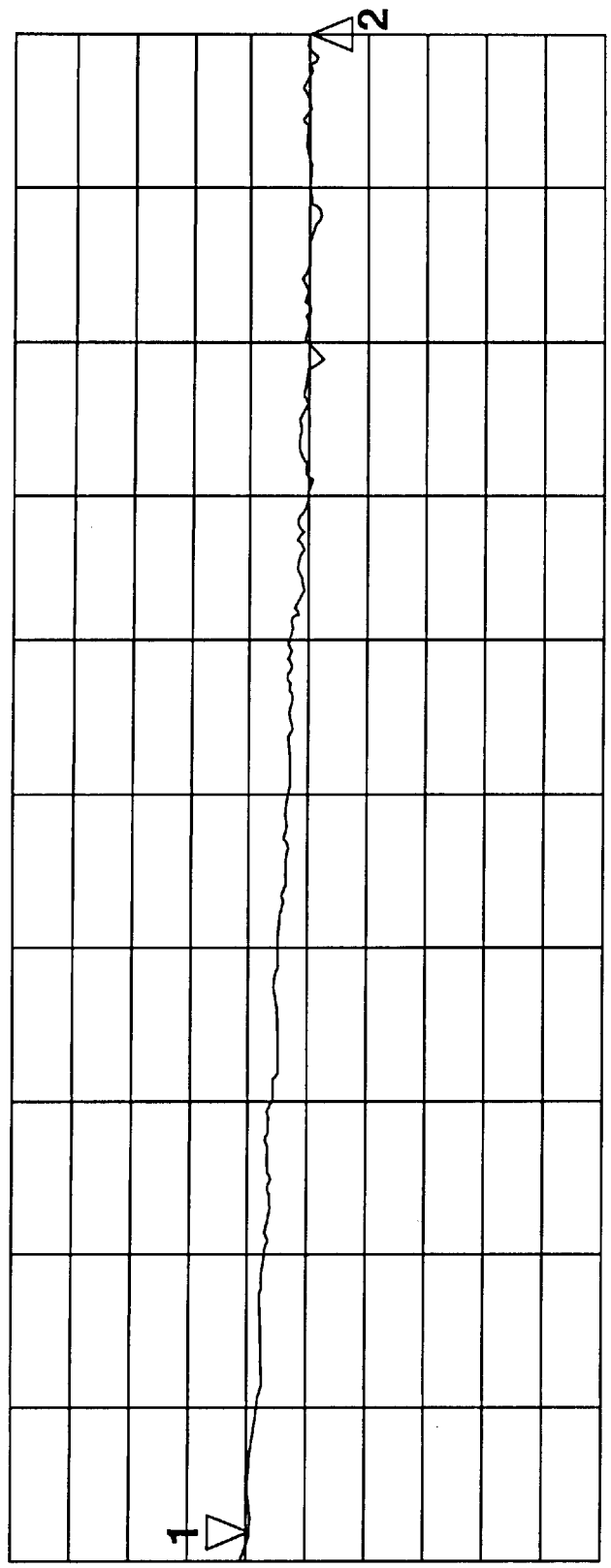
FIG. 14 is a graph of the optical modulation signal of an inventive modulator as a function of frequency over the frequency ranger form 0.13 to 20.0 GHz.

FIG. 14 shows the optical modulation signal for the same modulator to 20 GHz. Note that the optical modulation signal drops by only 5 dBe over this frequency range, which is significantly better than known commercially available modulators.

Detailed Description of Fabrication Processes

Figure 2:
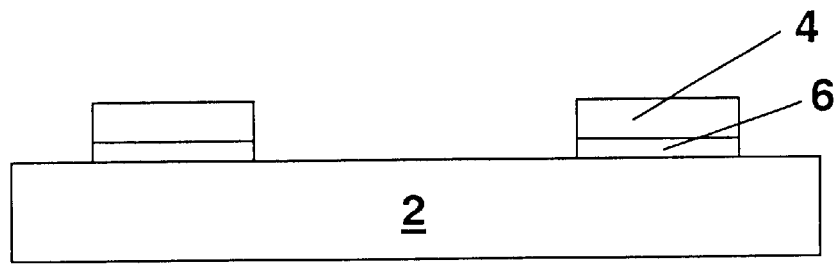
FIG. 2 is a diagrammatic front elevational view of a substrate with electrode metallization.

The method of fabricating modulator 1 is outlined immediately below and detailed in the following description.
Outline
  I. Fabrication of metallization
    a. Unpatterned seed layer technique
    b. Patterned seed layer technique
      i. two methods of seed layer patterning
  II. Photopolymer specifics
  III. Adhesion layer deposition techniques
  IV. Electroplating
    a. Chemistry
    b. Setup
    c. Waveform FIG. 2 shows substrate 2, with metallization 4 fabricated on the surface of substrate 2; if, as is normally the case, the aforementioned buffer layer is to be included in the structure, this buffer layer is formed on the waveguide prior to any formation of metallization 4 or other layers thereon. Waveguides have been formed in substrate 2 in any well-known manner such as with a metal indiffusion or an ion exchange process. Between substrate 2 and metallization 4, there is an adhesion layer 6 used to facilitate bonding between the substrate 2 and the metallization 4. Metallization 4 is preferably selected from low resistivity metals such as copper and silver. Deposition of the adhesion layer 6 in FIG. 2 is performed using standard thin film deposition techniques including thermal evaporation, RF sputtering, and electron beam evaporation. The adhesion metal layer normally has a thickness between 1000 and 10,000 angstroms. The function of this layer is twofold. The first function is to facilitate bonding between the electroplated metallization and the substrate surface. The second function is to provide a conductive base onto which the metal can be grown during electroplating, where this layer becomes the cathode, as will be described later.

Figure 3A:
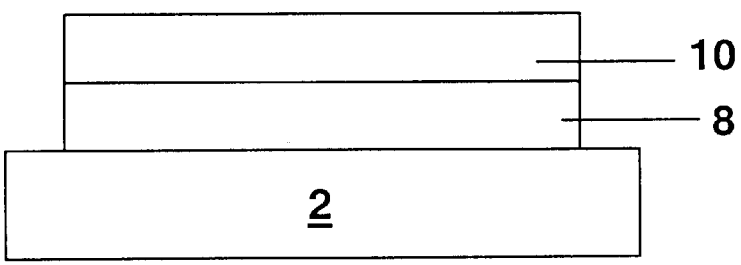
FIGS. 3a–e are diagrammatic front elevational views illustrating various lithographic steps of the method for fabricating thick metallization.
Figure 3B:
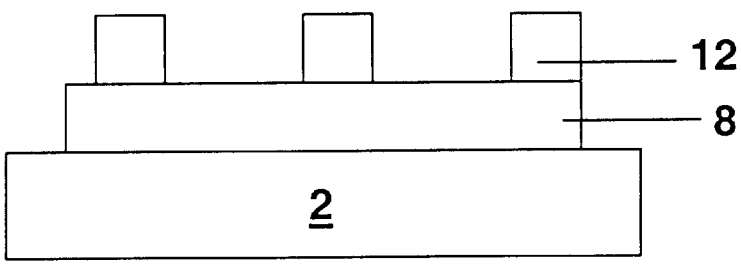
Figure 3C:
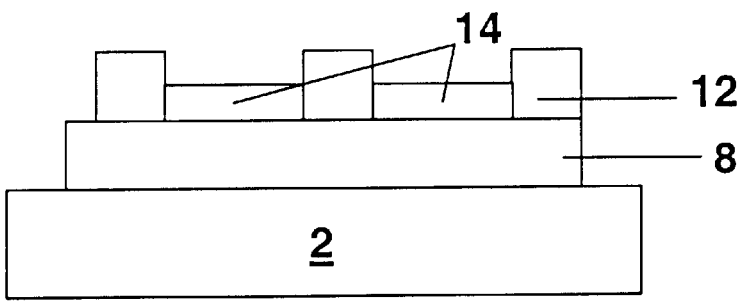
Figure 3D:
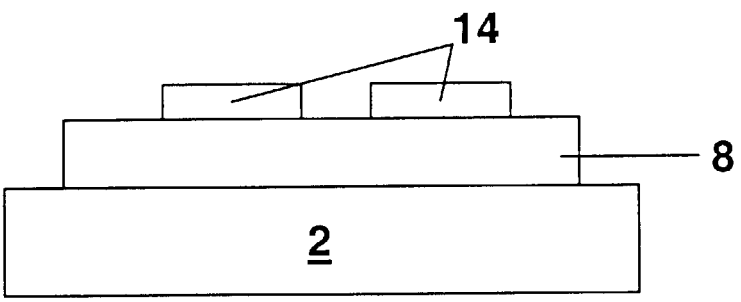
Figure 3E:
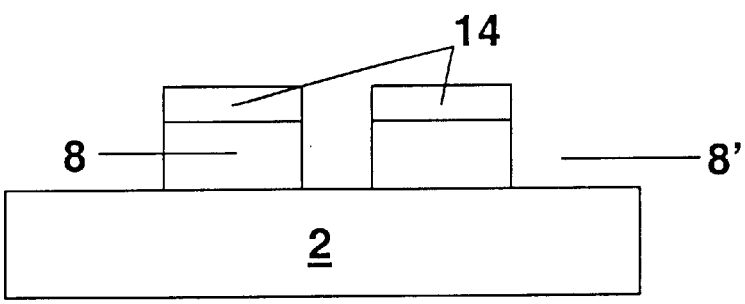

The metallization 4, can be constructed in two ways. FIG. 3 shows method number one. In FIG. 3a, a layer of seed metal 8 is deposited on substrate 2. A layer of photopolymer 10 is applied to the surface of the sample. In FIG. 3b, a standard lithography process is performed to pattern the photopolymer to produce the structures 12. Metal electroplating is used to grow a layer of metal 14 (FIG. 3C) on the exposed seed layer 8. The metal does not deposit in areas where photopolymer 12 remains because it is dielectric and protects the seed layer. The photopolymer 12 is chemically removed and only metal 8 and 14 remain (FIG. 3*d*). The sample is then immersed in the appropriate etchant to remove the thin areas of seed layer metallization 8 that were earlier protected by photopolymer. This leaves the larger structures on the substrate while removing the initial metal layer 8 in the areas 8' which were not electroplated (FIG. 3*e*).

Figure 4:
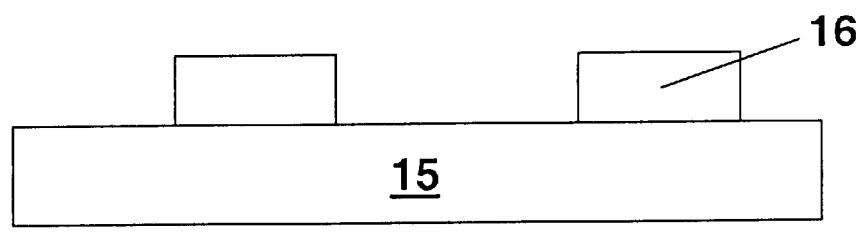
FIG. 4 is a diagrammatic elevational view illustrating a patterned seed layer on a substrate.
Figure 5A:
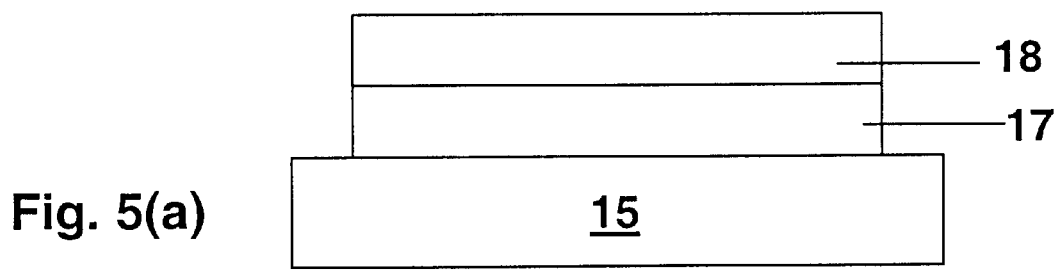
FIGS. 5a–e are diagrammatic elevational views illustrating the lithographic steps for first method of fabricating patterned seed layer metallization.
Figure 5B:
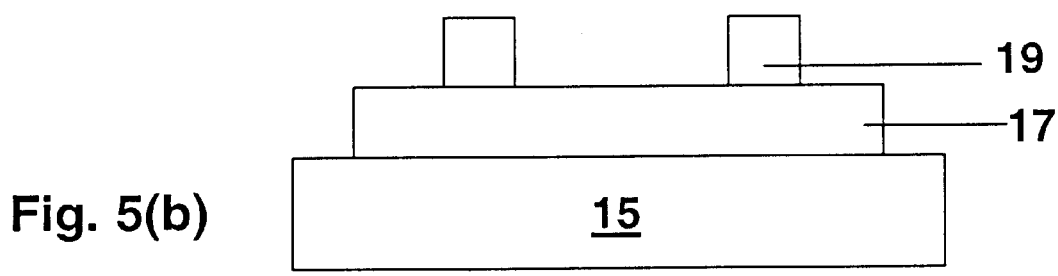
Figure 5C:
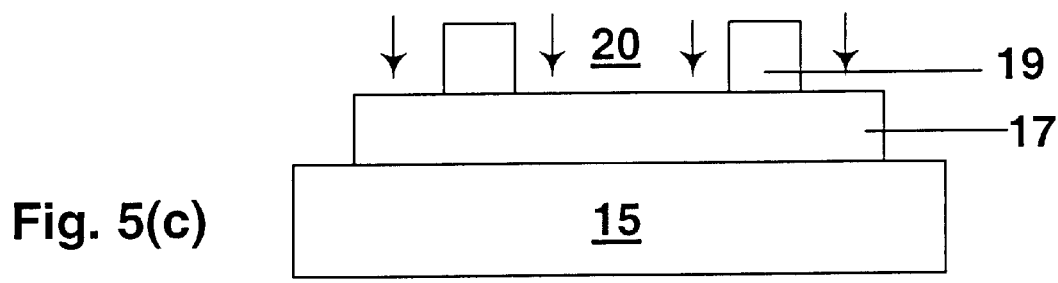
Figure 5D:
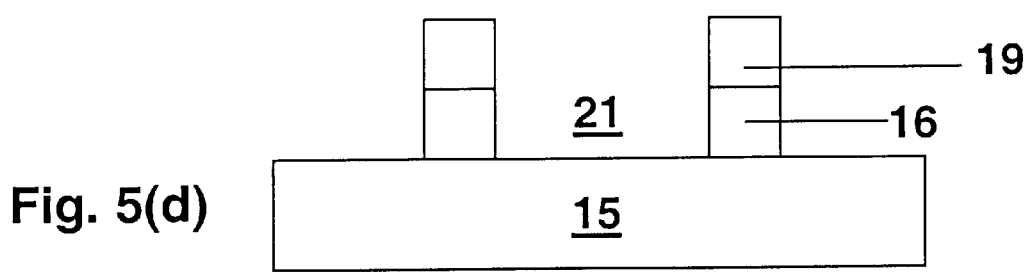
Figure 5E:
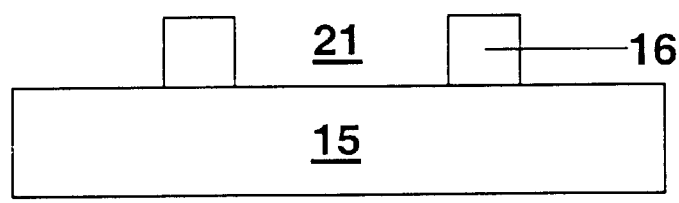

The second method of constructing the metallization involves patterning the initial metallization layer before electroplating. The finished patterned seed layer 16 on a substrate 15 is shown in FIG. 4. FIG. 5 shows the first of two methods for generating a patterned seed layer. FIG. 5*a* shows the deposition of a continuous metal layer 17 on the surface of the substrate 15 to the desired thickness. A photopolymer 18 is spun on top of the metal layer. In FIG. 5*b*, the photopolymer 18 is exposed and developed using standard lithography techniques to generate the structures 19. In FIG. 5*c*, the patterned photopolymer layer 19 is then used as a masking layer during a chemical etch of the metal layer 17. The chemical etchant 20, is introduced to the sample by immersing in a bath of etchant appropriate to etching the metal layer 17. The etchant 20 reacts with the metal in the areas not covered by the photopolymer layer 19. FIG. 5*d* shows the etching process complete resulting in area 21 with no metal layer. The photopolymer 19 is then removed from the sample, leaving the patterned metal layer 16 (FIG. 5*e*).

Figure 6A:
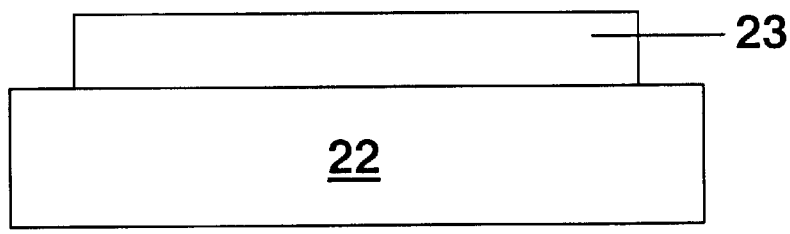
FIGS. 6a–d diagrammatic elevational view illustrating lithographic steps for a second method of fabricating patterned seed layer metallization.
Figure 6B:
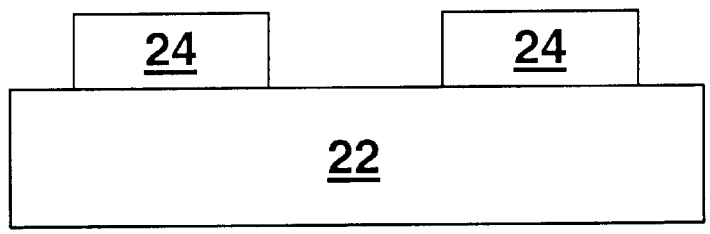
Figure 6C:
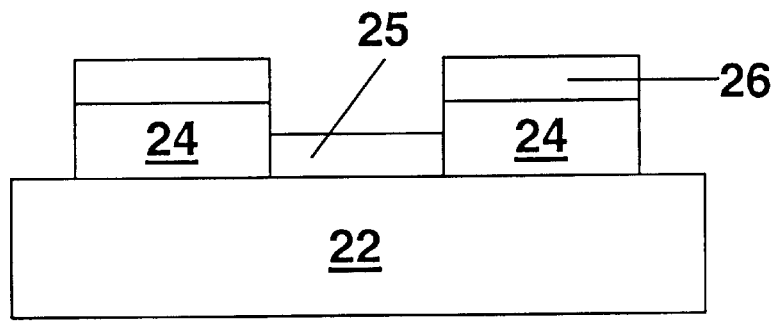
Figure 6D:
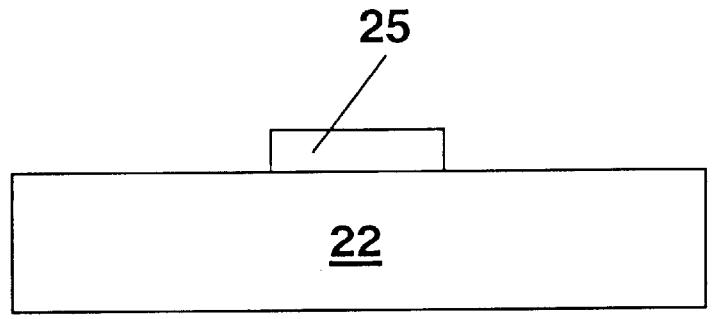

FIGS. 6*a–d* show the second of two methods of patterning the metal seed layer. FIG. 6*a* shows a photopolymer layer 23 that has been spun on a substrate 22. In FIG. 6*b*, the photopolymer layer 23 is patterned using standard lithography techniques to generate the structures 24. In FIG. 6*c*, the substrate is then coated with a metal layer 25 and 26 using vacuum deposition. In FIG. 6*d*, the photopolymer layer 24 has been removed by an appropriate solvent, lifting off the metal layers 26. The finished sample then has the patterned metal layer 25.

After the initial metallization layer has been generated by the methods shown in FIGS. 5 and 6, the electroplated structure is grown as shown in FIGS. 7*a–e*.

Figure 7A:
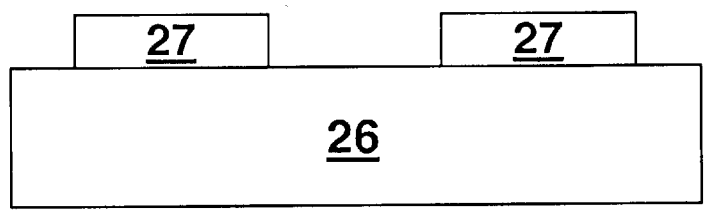
FIGS. 7a–e are diagrammatic elevational views illustrating various steps in electroplating thick metallization on the seed layer.
Figure 7B:
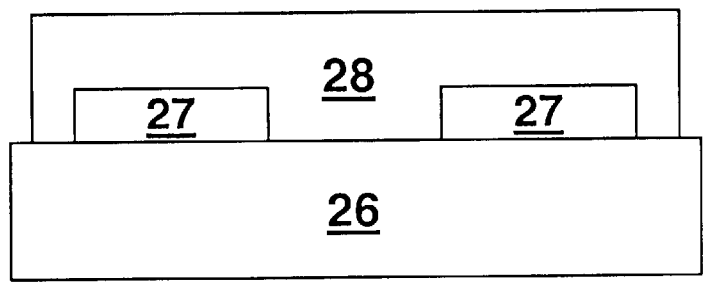
Figure 7C:
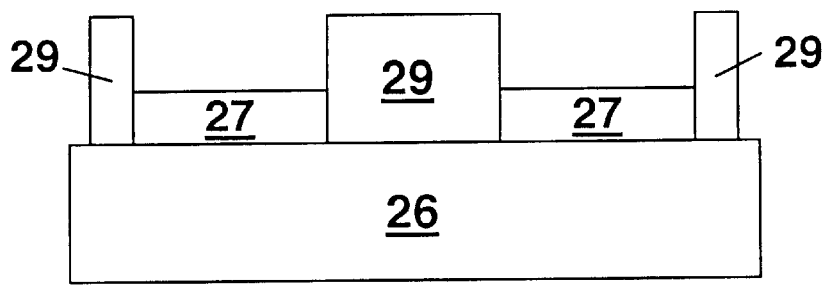
Figure 7D:
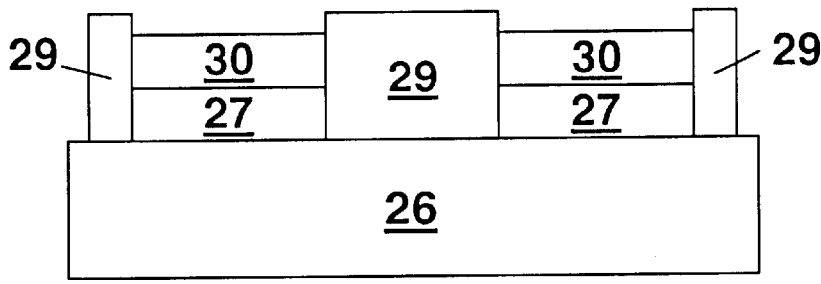
Figure 7E:
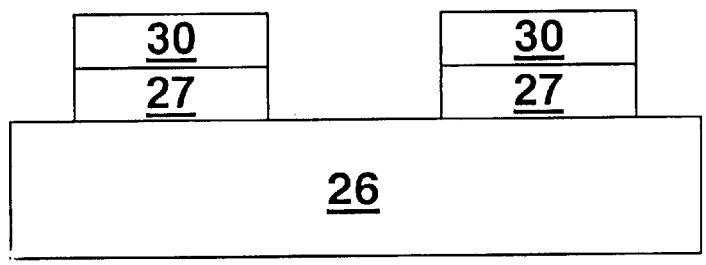

FIG. 7*a* shows a substrate 26 with patterned metallization 27. In FIG. 7*b*, a layer of photopolymer 28 is spun on the surface of the substrate 26. In FIG. 7*c*, the photopolymer is patterned into structures 29 to expose the metallizations 27 using standard lithography processes. The photopolymer 29 is again used to provide an insulating barrier during electroplating. In FIG. 7*d*, the sample is electroplated, depositing metal 30. The photopolymer 29 is then removed, leaving the desired structure shown in FIG. 7*e*.

The photolithography steps used in the previous descriptions are well known to those skilled in the art. The preferred embodiment is to use very thick photopolymer layers to fabricate thick metallizations because the photopolymer layer must always be thicker than the electroplated metal. Common techniques involve applying multiple layers of photopolymer. It is advantageous to use high viscosity photopolymers because each deposited layer is thicker.

Figure 8:
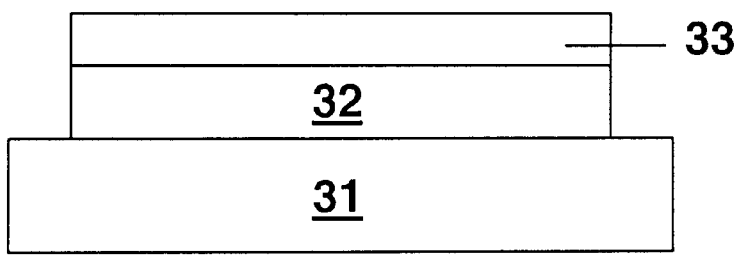
FIG. 8 is a diagrammatic elevational view showing structure with the adhesion layer and the seed layer.
Figure 9:
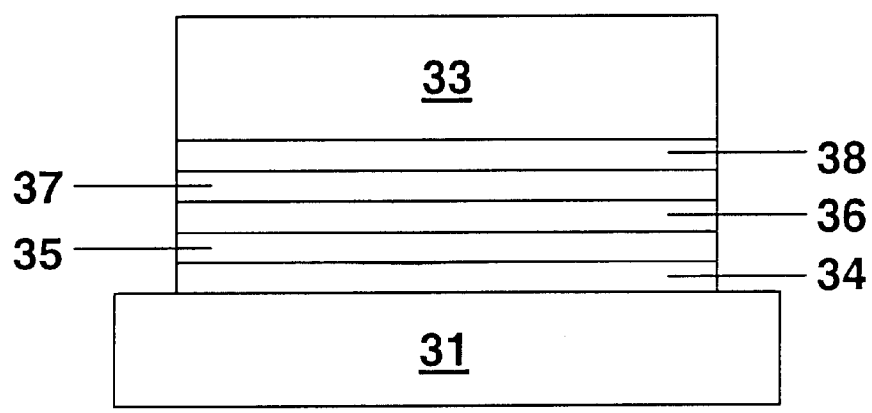
FIG. 9 is a diagammatic elevational view of structure showing the details of the adhesion layer and the seed layer.

Referring to FIG. 8, an adhesion layer 32 is beneath 'seed layer' 33. The adhesion layer is normally a composite of one or more layers of metal. The layers are deposited in very thin, less than 1000 Angstrom, thickness. The composition of the adhesion layer is chosen for its adhesion properties to substrate surface 31 and the seed layer metal 33. The preferred configuration for adhesion layer 32 for a copper seed layer 33 on lithium niobate substrate 31 is a five layer composite, composed of chromium and copper. FIG. 9 shows this structure. Layers 34 through 38 constitute the adhesion layer. The initial layer 34 is chromium, after which the layers alternate between chromium 36, 38 and copper 35, 37. The chromium layers are 250 Å thick, the copper 200 Å thick. The seed layer 33 is then deposited on top of layer 38 with a thickness of about 4000 Å. Other materials such as titanium, nickel, and Nichrome (Nickel and chrome alloy) can also be used instead of chromium for adhesion layers.

Figure 10:
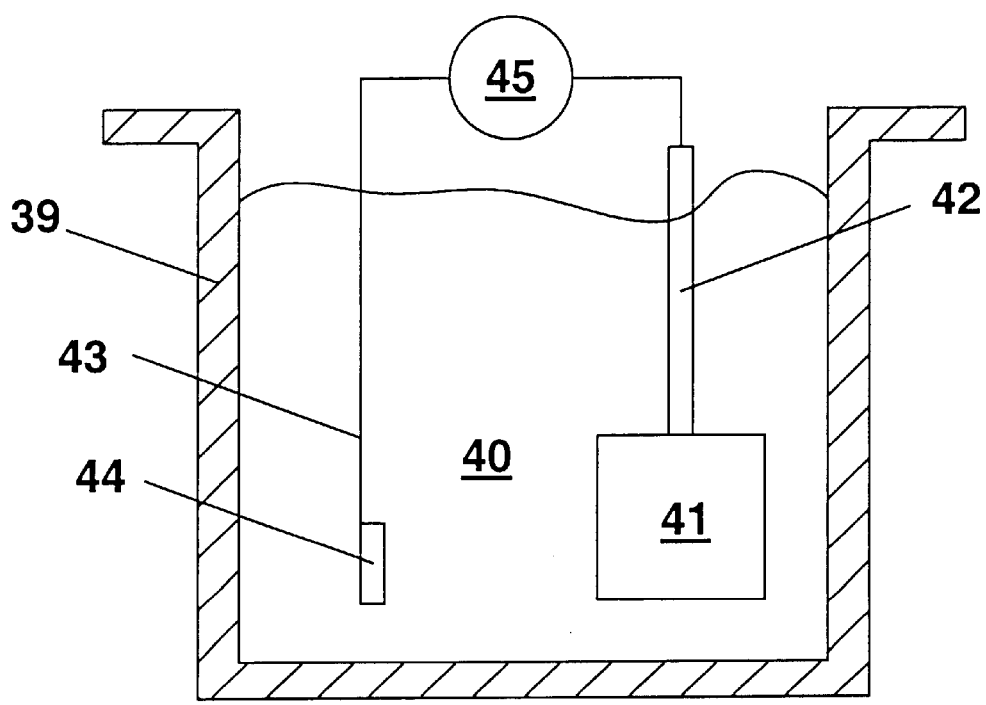
FIG. 10 is a diagrammatic view of the electroplating bath.

The electroplating process is shown in FIG. 10. The electrolyte is contained in a tank 39. The preferred material to electroplate is copper, which will be described here, but electroplating other types of metal is performed in a similar fashion with a different solution chemistry. The bath contains a cathode electrode 42 and an anode electrode 44. A substrate 41 is mounted onto the cathode 42 with an electrical connection between the cathode and the conductive surface onto which metal will be deposited (the seed layer). A copper source 43 is mounted onto the anode 44, again insuring electrical continuity The cathode 42 and anode 44 are then connected to a current supply 45 which provides the electroplating current to the process.

The bath tank 39 holds a solution 40 composed of the following materials:

| | |
|---|---|
| 665 grams | Copper pyrophosphate ($Cu_2P_2O_7.3H_2O$) |
| 760 grams | Potassium pyrophosphate ($K_2P_2O_7$) |
| 250 grams | Ammonium Nitride ($NH_4NO_3$) |
| 8 liters | Water ($H_2O$) |

Variable Ammonium Hydroxide —($NH_4OH$) (adjust solution pH 8.2–8.8) Copper pyrophosphate ionizes in water solution as follows:

$$Cu_2P_2O_7 \rightarrow 2Cu^+ + P_2O_7^- \qquad (1)$$

The ionized copper is attracted to the seed layer metallization on the substrate 41, which is connected to the cathode, where it deposits as metallic copper as follows:

$$2Cu^+ + 2e \rightarrow 2Cu \qquad (2)$$

The reciprocal reaction takes place at the anode 10 between the copper source 43 and the solution 40, described by:

$$2Cu + P_2O_7^- \rightarrow Cu_2P_2O_7 + 2e \qquad (3)$$

Total mass is conserved in this electroplating system under electrical excitation, and the reactions are electrically symmetric whereby, by reversing the electrical excitation, material can be taken from the substrate 41 and deposited on the source 43. No copper is depleted from the solution since the copper deposited at the cathode is exactly equal to the copper that enters the solution at the anode.

Figure 11:
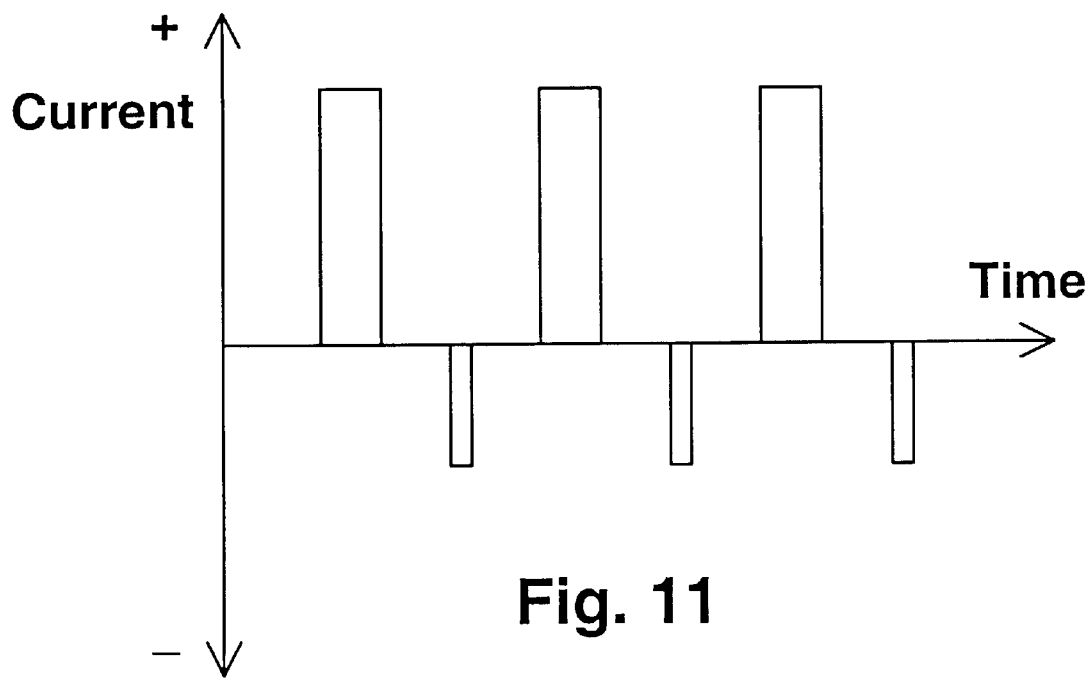
FIG. 11 is a diagrammatic representation of the electroplating current as a function of time.

The current applied by source 45 to the electroplating system is preferably pulsed and alternating in polarity, but can also be continuously applied. The preferred current waveform has a positive current pulse (for deposition), a wait period, followed by a negative pulse of less power (for removal). FIG. 11 shows the current waveform shape. The reason for using this type of waveform is to grow uniform layers of metal. If material deposition is followed by material removal, any peaks formed on the surface of the material are removed because the local field density is higher, making the removal process more efficient in these localized areas and smoothing the surface.

The use of metallizations for electrodes on modulators has been demonstrated. It has been shown that impedance, velocity matching, and drive voltage limit the operation of the device. The remaining limiting factor in device design and construction is the microwave propagation loss. We have found and demonstrated that the type of metal used in a particular design improves the performance of modulators.

The electrical drive power along a metal electrode is given by Equation 1 as follows:

$$P_{rf}(l) = P_o e^{-\alpha l}$$

where $\alpha$ is the loss per unit length of the electrode and $l$ is the distance the electrical wave has traveled. The frequency dependent conductor loss (See, for example, Chung et al, IEEE J. of Quantum Electronics, Vol. 27, No. 3, pp 608) is given by Equation 2 as follows:

$$\alpha(f) = \frac{1}{2} \frac{R(f)}{Zo}$$

where $R(f)$ is the frequency dependent resistance per unit length, which arises from the skin effect, and $Zo$ is the characteristic impedance of the electrical structure. The skin effect describes the electric field penetration into a conductor. The point at which the field strength has been reduced to $1/e$ of its boundary value is defined as the skin depth. It is given by Equation 3 as follows (See, for example, Wadell, Brian. *Transmission Line Design Handbook*, Artech House, 1991)

$$\delta = \frac{1}{\sqrt{\pi f \mu \sigma}}$$

where $f$ is the frequency, $\mu$ is the permeability, and $\sigma$ is the conductivity of the material.

Figure 12:
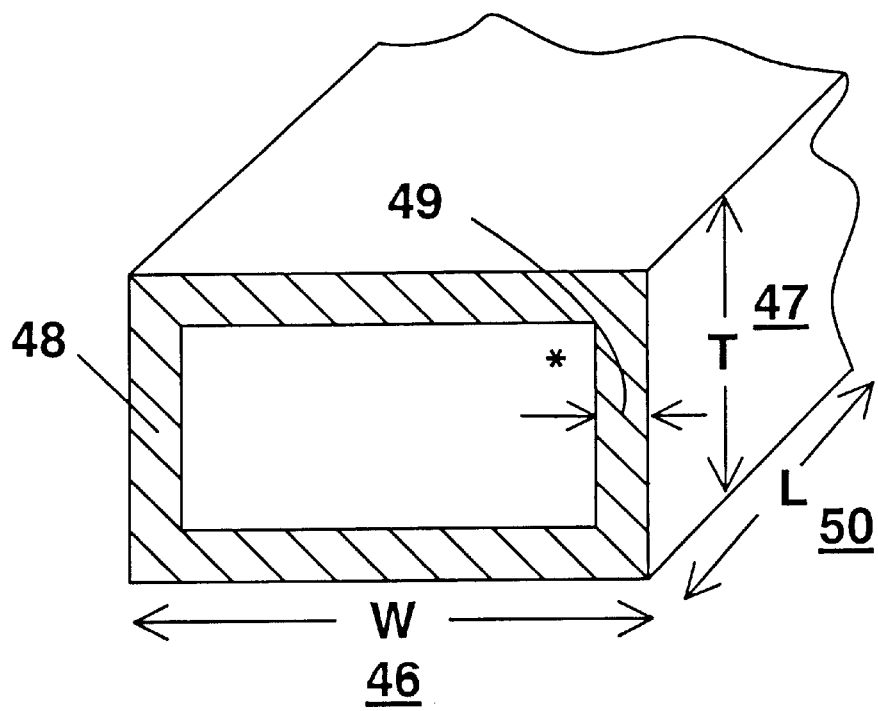
FIG. 12 is a diagrammatic illustration of the skin effect in metal electrodes.

FIG. 12 illustrates the skin effect. The width W of the conductor is indicated at 46, its thickness T at 47 and its length L at 50. The cross-hatched area 48 shows the electric field penetration at a given frequency. The skin depth $\delta$ is labeled at 49. The frequency dependent resistance per unit length is the shaded area 48 per unit length, which is given by Equation 4 as follows:

$$R(f) = \frac{\rho}{2(W+T)\delta}$$

where $\rho$ is the resistivity ($\Omega \cdot$ length) of the electrode material. Inserting Equation 3 into 4 and using $\sigma = 1/\rho$ yields Equation 5 as follows:

$$R(f) = \frac{1}{2(W+T)} \sqrt{\pi \mu \rho f}$$

Substituting Equation 5 and 2 into Equation 1 yields Equation 6 as follows:

$$P_{rf}(l) = P_o e^{-\left(\sqrt{\pi \mu f \rho}\ \frac{l}{4(W+T)Zo}\right)}$$

Equation 6 is the power of the electrical wave as it moves along the electrode. The bandwidth is normally defined as the frequency at which the RF power drops to half or 3 dB of its initial value. Solving Equation 6 for the frequency at which this occurs yields Equation 7 as follows:

$$f_{3dB} = 7.84 \frac{(W+T)^2 Zo^2}{L^2 (\pi \mu \rho)}$$

The electrical gain of the modulator is inversely proportional to the square of the drive voltage, shown by Equation 8:

$$\text{Gain} = C_1/V^2$$

where $C_1$ is a constant. The drive voltage is in turn an inverse function of the electrode length, so the gain becomes: (Equation 9)

$$\text{Gain} = C_2 L^2$$

where $C_2$ is a constant.

The most important trade off in terms of modulator performance is gain versus the bandwidth. We define a Figure of Merit, F, as the gain bandwidth product:

$$F = \text{Gain} \times \text{Bandwidth}$$

Multiplying Equations 7 and 9:

$$F = 7.84 C_1 \frac{(W+T)^2 Zo^2}{\pi \mu \rho}$$

In the design of the modulator, the geometric dimensions of the electrode structure, namely W, T. are chosen to yield velocity matched operation while also giving Zo=50 ohms. These dimensions are the same without regard to the specific metal used for the conductors. We therefore can simplify the Figure of Merit to:

$$F = \frac{C}{\rho}$$

Where C is a constant dependent on the electrode geometry, but independent of the conductor metal. Therefore, for purposes of comparing different metals, this constant will be set equal to unity, so that:

$$F = 1/\rho$$

Thus, the gain bandwidth product, F, is the inverse of resistivity.

This is illustrated in the table below:

| Metal | Resistivity ($\Omega \cdot$ cm) × $10^{-6}$ | Figure of Merit × $10^5$ |
|---|---|---|
| Silver | 1.59 | 6.3 |
| Copper | 1.67 | 6.0 |
| Gold | 2.35 | 4.3 |
| Aluminum | 2.66 | 3.84 |

Note that there is a 50% increase in gain bandwidth product in using copper in place of gold as the electrode material. Also, the increases in substituting aluminum for gold and copper for silver are marginal. Therefore, the switch from gold to copper or silver metallization is the preferred method of construction of the modulator.

Other changes will occur to those skilled in the art based on the teachings of the invention. For example, while the preferred method for forming electrodes is through the use of an electroplating process, it will be appreciated that electrodes may be formed by other processes such as via vacuum deposition or electrodeless plating. Such changes are intended to be within the scope of the invention.

What is claimed is:

1. An integrated optic modulator comprising:
   a substrate having formed therein at least one waveguide for propagating radiant energy therethrough;
   means for introducing radiant energy into said waveguide for propagation therein;
   at least two electrodes formed on the surface of said substrate proximate said waveguide;
   a buffer layer formed between the at least one waveguide and the at least two electrodes; and
   an RF source connected to said electrodes for creating an electric field for modulating radiant energy propagating in said waveguide wherein said waveguide and said electrodes are velocity matched and said electrodes are composed of a low resistivity material such that the gain bandwidth product of said modulator is equal to or greater than $4.5 \times 10^5$ Hz.

2. An integrated optic modulator according to claim 1 wherein the substrate comprises lithium niobate.

3. An integrated optical modulator according to claim 1 wherein said buffer layer comprises silicon dioxide.

4. An integrated optic modulator according to claim 1 wherein said means for introducing radiant energy comprises at least one optical fiber.

5. An integrated optic modulator according to claim 1 wherein said low resistivity material comprises copper.

6. An integrated optic modulator according to claim 5 wherein said copper is electrodeposited copper.

7. An integrated optic modulator according to claim 1 wherein said low resistivity material comprises silver.

8. An integrated optic modulator according to claim 1 wherein said at least two electrodes comprise a central electrode and two ground planes disposed on opposed sides of, and spaced from, said central electrode.

9. An integrated optic modulator according to claim 1 which has a Mach Zhender architecture.

10. An integrated optic modulator according to claim 1 further comprising an adhesion layer, comprising at least one layer of metal between said substrate and said at least two electrodes.

11. An integrated optic modulator according to claim 10 wherein said adhesion layer comprises alternating layers of chromium and copper, with chromium layers being in contact with said substrate and said at least two electrodes.

12. An integrated optic modulator according to claim 11 wherein said alternating layers of chromium and copper have thicknesses of from about 200 to about 250 Å.

* * * * *